United States Patent

Edstrom et al.

[15] 3,673,669

[45] July 4, 1972

[54] METHOD OF MAKING SIDE ENTRY CARD GUIDES

[72] Inventors: Woodrow O. Edstrom; Charles H. Norling, both of Bloomington, Minn.

[73] Assignee: Sperry Rand Corporation, New York, N.Y.

[22] Filed: Nov. 19, 1970

[21] Appl. No.: 90,992

[52] U.S. Cl. ..............................29/428, 29/172, 339/176 R, 339/176 MP

[51] Int. Cl.........................................................B23p 19/00

[58] Field of Search......................29/428, 172; 174/101, 16; 339/65, 17, 176 R, 176 M, 176 MP; 24/230

[56] References Cited

UNITED STATES PATENTS

| | | | |
|---|---|---|---|
| 3,231,785 | 1/1966 | Calabro | 317/100 |
| 3,277,426 | 10/1966 | Klostermann | 339/176 R X |
| 3,478,299 | 11/1969 | Cinatl et al. | 339/176 M |

*Primary Examiner*—John F. Campbell
*Assistant Examiner*—Victor A. DiPalma
*Attorney*—Kenneth T. Grace, Thomas J. Nikolai and John P. Dority

[57] ABSTRACT

A method of forming a device for guiding and supporting a plurality of printed circuit cards incorporating electronic circuitry is disclosed. The device is formed of two sheet members having a series of tabs formed therefrom. The tabs of the two sheet members are oriented with the tabs of one sheet member extending through corresponding openings in the second sheet member forming pairs of opposing tabs between which printed circuit cards are compressively restrained. The sheet members may be of heat conductive and/or electrically conductive materials to function as a heat sink coupling means and/or as a ground/voltage bus for side entry of printed circuit cards.

6 Claims, 8 Drawing Figures

INVENTORS
WOODROW O. EDSTROM
CHARLES H. NORLING
BY Kenneth T. Grace
ATTORNEY

INVENTORS
WOODROW O. EDSTROM
CHARLES H. NORLING
BY Kenneth T. Grace
ATTORNEY

INVENTORS
WOODROW O. EDSTROM
CHARLES H. NORLING
BY Kenneth T. Grace
ATTORNEY

METHOD OF MAKING SIDE ENTRY CARD GUIDES

BACKGROUND OF THE INVENTION

The present invention relates to the electronic packaging art and in particular to means for compressively restraining printed circuit cards while in operative condition yet permitting sliding assembly and disassembly without the need for attaching hardware. Prior art arrangements — see the J. Custer U.S. Pat. No. 3,193,316 — have included opposing parallel side members having opposing grooves or slots that function as a printed circuit card guide during insertion and removal of the printed circuit card into and from a printed circuit card electrical connector that is mounted in a base member orthogonally attached to the side members. Such grooves have, of a necessity, loosely restrained the printed circuit card for ease of insertion and removal. Other arrangements have proposed replacing the opposing grooves by providing opposing raised strips — see the L. Novet U.S. Pat. No. 3,382,476 — or by providing demountable track elements having bent resilient finger elements for guidingly receiving and gripping the printed circuit cards — see the A. Calabro U.S. Pat. No. 3,231,785. However, such prior art arrangements have not permitted using the printed circuit card guide for both compressively restraining the printed circuit card and coupling electrical voltage/ground leads on the printed circuit card to the supporting structure while additionally transferring printed circuit card generated heat to a heat sink — see H. Kamei, et al. U.S. Pat. No. 3,268,772.

SUMMARY OF THE INVENTION

The present invention provides a novel device for permitting side entry of the printed circuit card, i.e., insertion and removal of the printed circuit card along the longitudinal axis of the open face of the printed circuit card electrical connector, in contrast to the prior art means that required top entry of the printed circuit card, i.e., insertion and removal of the printed circuit card along an axis that is normal to the open face of the printed circuit card electrical connector. Further, applicants' novel device may concurrently function as a mechanical guiding and restraining means, as an electrical coupling means and as a heat transfer means. The novel device consists of two sheet members of which a plurality of tabs and associated openings are formed. The two sheet members are then reversely oriented in a superposed, parallel, planar manner with the individual tabs of the first sheet member passing through the corresponding openings in the second sheet member. Pairs of opposing tabs, one tab of each of the first and second sheet members, are thus formed having a nominal separation determined by the thickness of the printed circuit card that is to be passed therebetween. The sheet members may be of many materials: electrically insulative material functioning as insulative guiding and restraining means for a printed circuit card; electrically conductive means for functioning as a ground/voltage coupling means for electrically coupling printed circuit card circuits to a corresponding circuit on a supporting structure; or, heat conductive means for transferring printed circuit card generated heat to a heat sink on a supporting structure.

DESCRIPTION OF THE PREFERRED EMBODIMENT

Figure 1:
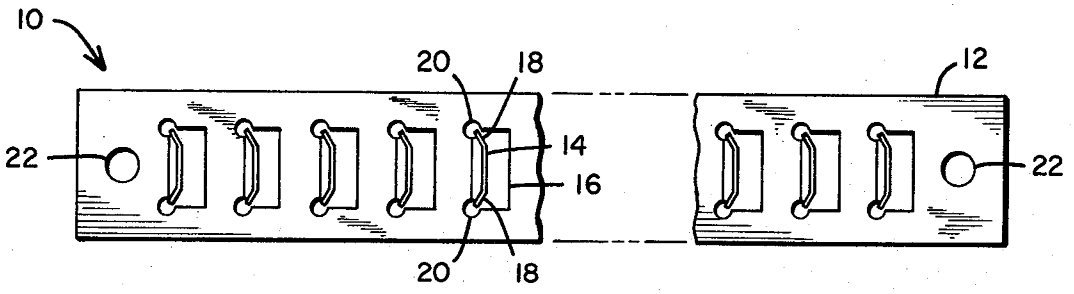
FIG. 1 is a plan view of one tab strip of the present invention.
Figure 2:
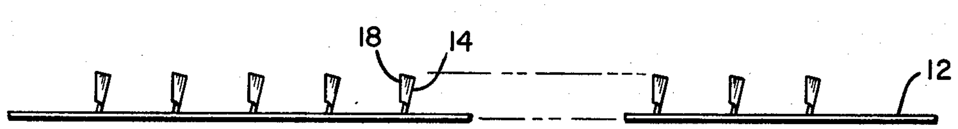
FIG. 2 is a side view of the tab strip of FIG. 1.

With particular reference to FIGS. 1, 2 there are presented a plan and a side view of one of the tab strips 10 of the present invention. Tab strip 10 consists of a 0.010-inch thick sheet 12 of an electrically conductive material such as tin plated beryllium-copper having a plurality of tabs 14 formed therefrom. Tabs 14 are preferably formed in a punching operation in which the tabs 14 are punched from the sheet 12 forming the corresponding openings 16 in sheet 12. Tabs 14 are preferably bent up from the plane of sheet 12 at an angle less than 90° – 77° in the illustrated embodiment — and preferably formed with side flanges 18 extending away from the opening 16. Additionally, bend radius relief holes 20 may be predrilled in sheet 12 to obviate cracking of tabs 14 in the area of the bend radius of tabs 14. Further, a plurality of holes 22 (at the ends of tab strips 10 or spaced intermediately) may be predrilled or punched for mounting and/or alignment of the assembled tab strips 10 upon a suitable support structure.

Figure 3:
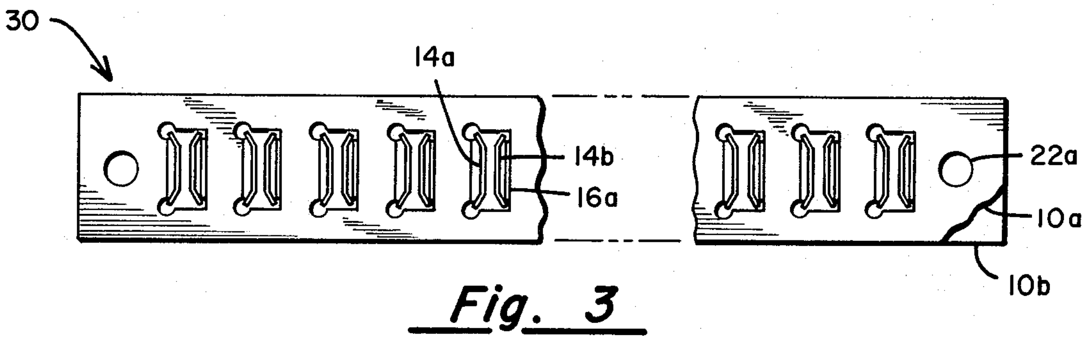
FIG. 3 is a plan view of two tab strips of FIGS. 1, 2 assembled to form the card guide of the present invention.
Figure 4:
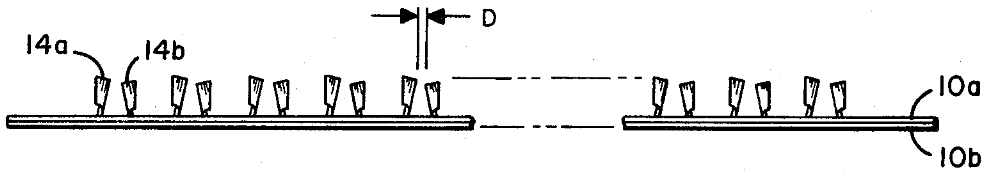
FIG. 4 is a side view of the card guide of FIG. 3.

With particular reference to FIGS. 3, 4 there are presented a plan and a side view of two tab strips 10 of FIGS. 1, 2 assembled to form the card guide 30 of the present invention. In assembling card guide 30, the two tab strips 10*a*, 10*b* are assembled in a superposed, parallel, planar manner, with tab strip 10*a* above tab strip 10*b* with the tabs 14*a* of tab strip 10*a* oriented in a reversed or opposing manner as compared to tabs 14*b* of tab strip 10*b*. The individual tabs 14*b* of the bottom tab strip 10*b* are then passed through the corresponding openings 16*a* in tab strip 10*a* — see FIG. 4. Pairs of opposing tabs 14, tab 14*b* from bottom tab strip 10*b* and tab 14*a* from top tab strip 10*a*, are thus formed having a nominal separation D determined by the relative placement of the alignment holes 22 with the nominal separation D determined by the nominal thickness of the printed circuit card that is to be passed therebetween. Pairs of opposing tabs 14*a*, 14*b*, each being bent up from the plane of its respective sheet 12*a*, 12*b* at an angle less than 90° provides a compressively resilient guide means for printed circuit card that is to be passed therebetween.

Figure 5:
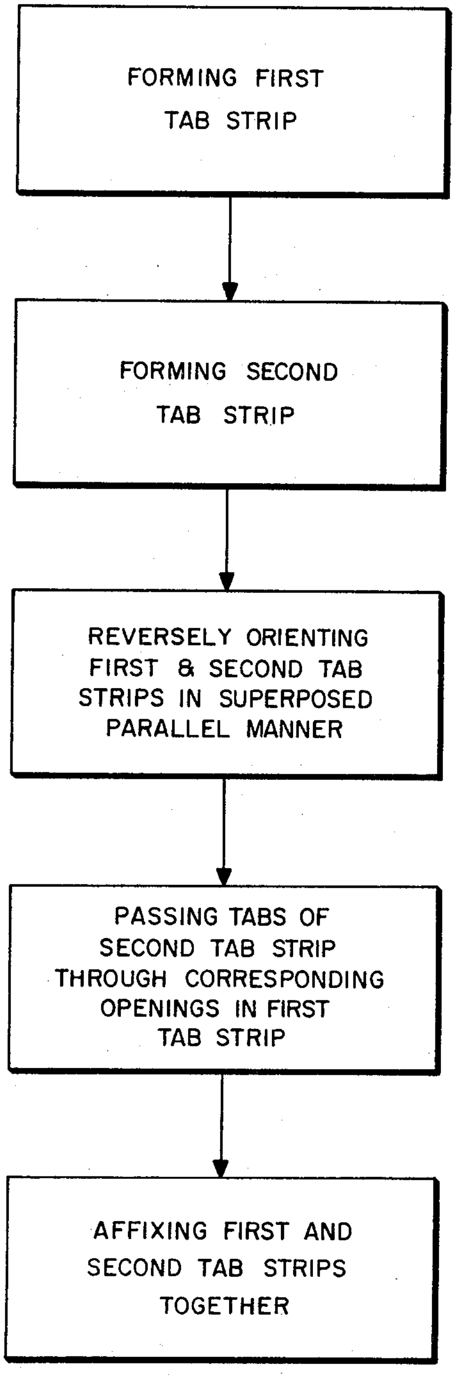
FIG. 5 is a flow diagram illustrating a typical series of steps that may be followed in preparing a card guide in accordance with the preferred technique of the present invention.
Figure 6:
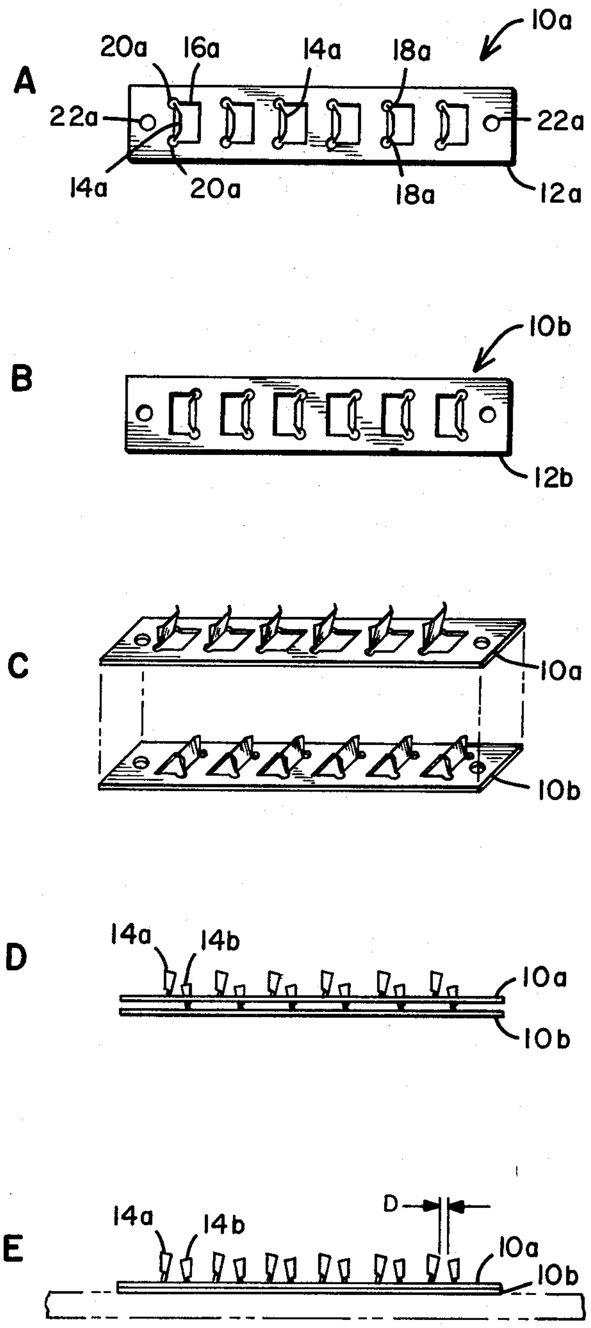
FIG. 6 is a series of views illustrating a typical production card guide that is under preparation in accordance with the technique of FIG. 5, the various figures illustrating the element progressively at various stages of its production and corresponding to the steps that are indicated adjacently in the flow diagram of FIG. 5.

Discussion of an exemplary method of fabrication of card guide 30 as proposed by the present invention shall proceed with reference to FIGS. 5 and 6. FIG. 5 illustrates a flow diagram of a series of steps that may be followed in preparing a card guide in accordance with the preferred technique of the present invention. FIG. 6 illustrates progressively the appearance of the product of the present invention during various stages of its fabrication. Each of the illustrations of FIG. 5 are located adjacent a step during which it is formed as seen in the flow chart of FIG. 5. Card guide 30 is formed in the following exemplary steps;

Step A

As indicated by the flow diagram of FIG. 5, a preferred method of practicing the present invention commences with the forming or shaping to the desired dimensions of a sheet member 12*a* into a tab strip 10*a* having a plurality of identical taps 14*a* oriented equally spaced along the longitudinal axis of sheet member 12*a*. Tab strip 10*a* is preferably formed of a 0.010 sheet member 12*a* of an electrically conductive material such as tin plated beryllium-copper. Tabs 14*a* are preferably formed in a punching operation in which the tabs 14*a* are punched from the sheet member 12*a* forming the corresponding opening 16*a* in sheet member 12*a*. Tabs 14*a* are preferably bent up from the plane of sheet member 12*a* at an angle less than 90° - 77° in an illustrated embodiment— and are preferably formed with side flanges 18*a* extending away from the openings 16*a*. Additionally bend radius relief holes 20*a* may be predrilled in sheet member 12*a* to obviate cracking of tabs 14a in the area of the bend radius of tabs 14a. Further, a plurality of holes 22a (at the ends of tab strip 10a or spaced intermediately) may be predrilled or punched for mounting and/or alignment of the assembled tab strips 12a upon a suitable support structure.

Step B

After forming tab strip 10a of Step A, an identical tab strip 10b is formed in a like manner as in Step A whereupon there are produced two identical tab strips 10a, 10b.

Step C

After forming, tab strips 10a, 10b of Steps A, B are reversely oriented along their longitudinal axis in a superposed, parallel, planar manner with their respective tabs 14a, 14b in an upwardly extending orientation.

Step D

After reversely orienting tab strips 10a, 10b in Step C, the upwardly extending tabs 14b of tab strip 10b are passed through the corresponding openings 16a in tab strip 10a.

Step E

After loosely assembling tab strips 10a, 10b in Step D, tab strips 10a, 10b are set into a fixed relationship forming pairs of fixed, opposing tabs 14a, 14b having a nominal separation D determined by the thickness of the printed circuit card that is to be passed therebetween. The fixed assembly of tab strips 10a, 10b may be accomplished by many well known methods such as: riveting using alignment holes 22a, 22b; brazing; soldering; adhesively bonding by any appropriate bonding material. Additionally, tab strips 10a, 10b may be set into a fixed relationship by directly mounting the loose assembly of Step D upon a suitable support structure.

Figure 7:
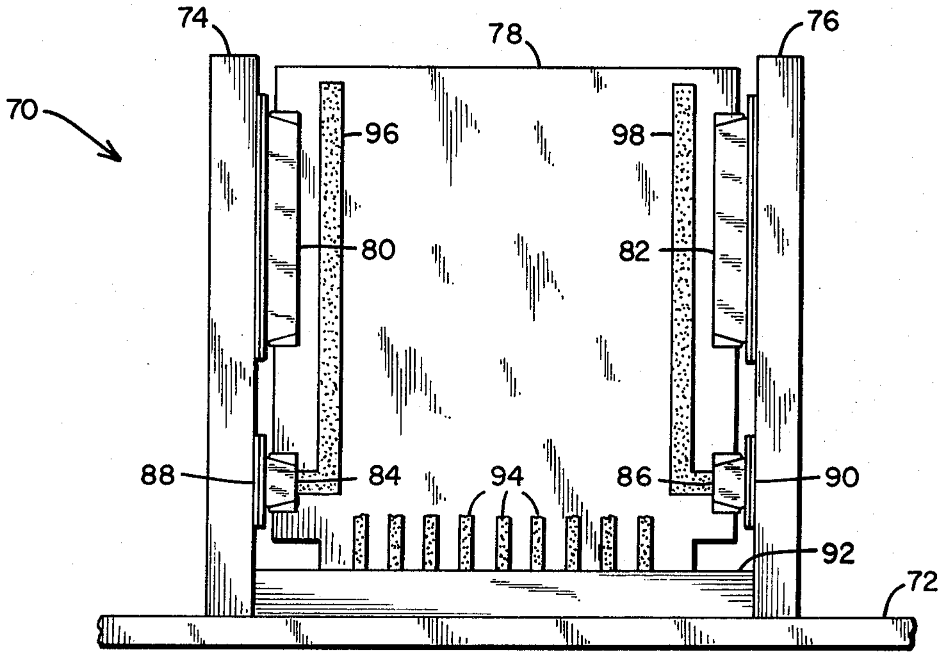
FIG. 7 is an end view of a plug-in module incorporating the card guide of the present invention.

With particular reference to FIG. 7 there is presented an end view of a plug-in module incorporating the card guide of the present invention. Plug-in module 70 includes a base member 72 and two orthogonally mounted side members 74, 76 which may be heat sinks such as that of the H. Kamei, et al. U.S. Pat. No. 3,268,772.

Printed circuit card 78 is mounted in plug-in module 70 by insertion between the opposing tabs of side-entry card guides 80 and 82 and side-entry voltage and ground buses 84 and 86, which are insulatively mounted on side members 74 and 76 using insulative strips 88 and 90. Insertion into top-entry printed circuit connector 92 couples the signal carrying printed circuit members 94 of printed circuit card 78 to external signal sources and utilization means while insertion into side-entry voltage and ground buses 84 and 86 couple the voltage and ground carrying printed circuit members 96 and 98 of printed circuit card 78 to their associated external sources.

Card guides 80 and 82, in addition to securely restraining printed circuit card 78, function as heat coupling devices carrying the heat generated by the electronic devices on printed circuit cards 78 into heat sinks 74 and 76.

Figure 8:
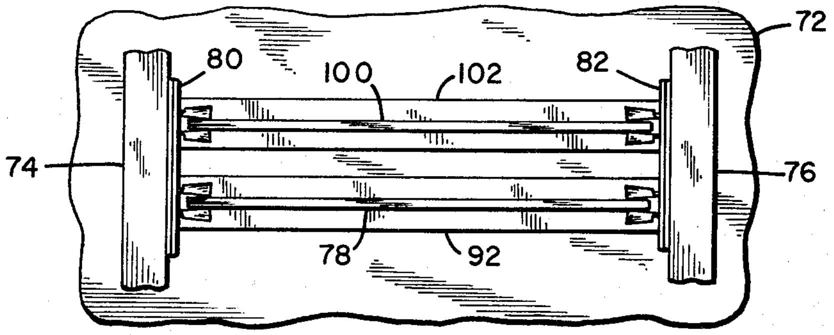
FIG. 8 is a top view of the plug-in module of FIG. 7.

With particular reference to FIG. 8 there is presented a top view of plug-in module 70 of FIG. 7. FIG. 8 illustrates a plurality of printed circuit cards 78, 100 and their associated printed circuit connectors 92, 102 as would normally be mounted in a plug-in module — see S. Askren U.S. Pat. No. 3,484,129. Here the novel side-entry card guides 80, 82 compressively restrain printed circuit cards 78, 100 for reliable assembly of plug-in module 70 while permitting ease of insertion and removal of printed circuit cards 78, 100 in and from printed circuit card guides 84 and 86 that function as voltage and signal buses and in and from printed circuit connectors 92 and 102.

What is claimed is:

1. The method of forming a side-entry card guide, comprising:

- forming a first series of spaced apart tabs and associated openings from and in a first sheet member;
- forming a second series of spaced apart tabs and associated openings from and in a second sheet member;
- reversing the orientation of said first and second series of tabs in a superposed manner;
- passing the individual tabs of said first series of tabs through corresponding individual ones of said openings in said second sheet member;
- forming a plurality of pairs of opposing tabs from corresponding tabs of said first and second series of tabs; and,
- forming a plurality of fixed opposing tabs from said plurality of pairs of opposing tabs by affixing said first and second sheet members to each other.

2. The method of claim 1 in which said first and second series of tabs are identical in pattern.

3. The method of claim 1 in which said first and second sheet members are formed of a heat and electrically conductive material.

4. The method of claim 1 in which said tabs are formed from said first and second sheet members by a punching process.

5. The method of claim 1 in which said tabs are bent up from the planes of said first and second sheet members at approximately 77°.

6. The method of claim 1 in which the sides of said tabs are formed with flanges extending away from the opposing tab.

* * * * *